Nov. 30, 1937.                C. E. SORENSEN                2,100,525
                                  PISTON
                           Filed March 22, 1935
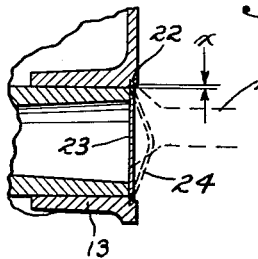
Fig. 5.
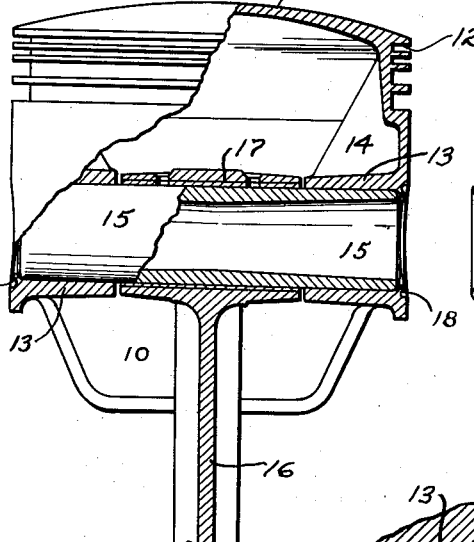
Fig. 1.
Fig. 4.
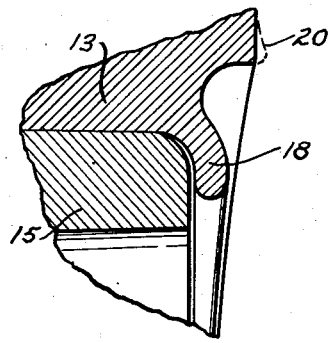
Fig. 3.
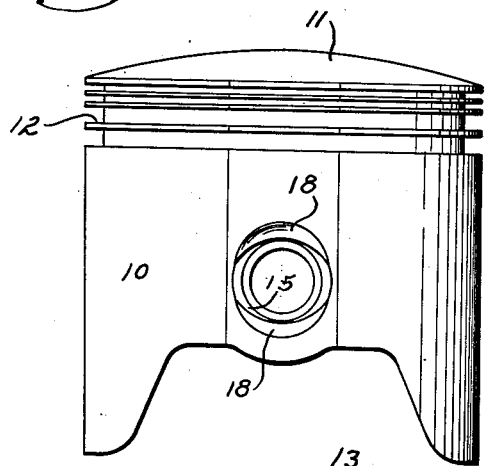
Fig. 6.
Fig. 2.
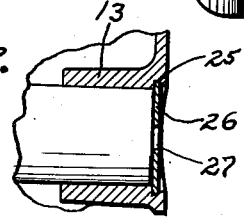
Fig. 7.
INVENTOR.
C. E. Sorensen.
BY
ATTORNEY.

Patented Nov. 30, 1937

2,100,525

UNITED STATES PATENT OFFICE 2,100,525

PISTON

Charles E. Sorensen, Detroit, Mich., assignor to Ford Motor Company, Dearborn, Mich., a corporation of Delaware Application March 22, 1935, Serial No. 12,392

4 Claims. (Cl. 309—19)

The object of my invention is to provide a piston especially suitable for use in reciprocating engines. The unique feature of my piston is that the piston pin is secured therein in a novel and improved manner. It is well known in connection with internal-combustion engines that means must be provided to prevent the ends of the piston pin from coming in contact with the cylinder walls. In order to do this it has been usual practice to lock the wrist pin into either the piston or the connecting rod so that a definite clearance between the ends of the piston pin and the cylinder walls was obtained. The disadvantage of this construction is that in such case all of the wear, due to the oscillation of the connecting rod, necessarily occurs between the pin and the part which is free to float on the pin. When the pin is fixed to the piston all of the wear occurs between the connecting rod bearing and the pin, while if the pin is fixed to the connecting rod all of the wear occurs in the piston. In order to lessen the wear at the connecting rod, it has been found desirable to allow the pin to float freely in both the piston and the connecting rod bearing, thereby almost doubling the effective bearing surface between the members. In such case means must be provided to prevent the pin from coming into contact with the cylinder walls.

Several devices have been used in the past to accomplish the above mentioned purpose. One of these devices comprises a construction wherein a split ring is partially inserted in an internal groove which is formed around the center of the connecting rod bearing. The piston pin is provided with a central annular external groove therein. The split ring thereby resiliently retains the pin in the connecting rod without preventing relative rotation. The disadvantage of this construction is that the manufacturing cost is very high and further, that the provision of a groove around the center of the piston pin materially weakens the pin and allows an increased deflection. This deflection causes binding in the bearings, which binding produces a substantial frictional loss and causes excessive bearing wear.

Other devices have been used for this purpose, such as relatively soft bearing blocks which are inserted in the ends of the piston pin and which coact with the cylinder walls. These blocks prevent the hard pin from contacting with the cylinder walls. Still another device for this same purpose comprises a pair of snap rings which snap into internal grooves which are formed in the piston near the outer ends of the pin bearings. The pin is thereby centered between these two rings.

In one form of my improved construction I propose to secure the pin in the piston by spinning two pairs of diametrically opposed ears from the material of the piston, which ears extend down over the respective ends of the pin. Numerous tests have proven that this retaining means is adequate to retain the piston pin in the piston under all conditions encountered in the operation of the motor. In another form of my device I propose to secure the pin in the piston by expanding a bar across the pin opening into a pair of diametrically opposed grooves formed at each end of the piston pin.

With these and other objects in view, my invention consists in the arrangement, construction and combination of the various parts of my improved device, as described in the specification, claimed in my claims and illustrated in the accompanying drawing, in which:

Figure 1 is a central sectional view through a piston, connecting rod and piston pin assembly, the piston having one form of my improved pin retaining means incorporated therein.

Figure 2 is a side view of the piston shown in Figure 1, illustrating the shape of the retaining ears.

Figure 3 is an enlarged sectional view through one of the retaining ears which are shown in Figures 1 and 2.

Figure 4 is a view of the spinning tool which I prefer to use in forming the ears shown in the aforementioned figures.

Figure 5 is a central sectional view through a piston and pin, showing my expanded bar method of pin retention.

Figure 6 is a side view of the piston and pin, shown in Figure 5, and

Figure 7 is a central sectional view through a piston and pin, showing still another alternate construction.

Referring to the accompanying drawing, I have used the reference numeral 10 to indicate a cylindrical piston skirt having a head 11 cast integrally therewith. A plurality of ring grooves 12 are machined in the upper portion of the piston skirt in the conventional manner and a pair of axially aligned piston pin bosses 13 are cast integrally with the piston skirt, each of these bosses extending from the piston skirt about a quarter of the way across the piston. These bosses are reamed out to rotatably receive a piston pin. Suitable reinforcing ribs 14 are cast integrally with the bosses and piston in the conventional manner.

A piston pin 15 is rotatably mounted within the bosses 13, this pin having a tapered bore therein so that maximum bending resistance in proportion to the weight thereof is obtained. A connecting rod 16 is provided, this rod having a piston pin bearing 17 formed on its upper end in which bearing the intermediate portion of the piston pin is rotatably mounted. The piston pin therefore rotates freely in both the piston and the connecting rod bearing.

Means will now be described whereby the piston pin is prevented from moving endwise in the piston pin bosses so as to bear against the walls of the cylinder in which the piston is reciprocated. The piston itself is preferably formed from a steel alloy having a low coefficient of friction when used with cast iron and having about the same ductility as malleable iron. Referring to Figure 4 of the drawing, it will be noted that I have provided a cylindrical spinning tool 19 having a diameter about an eighth of an inch larger than that of the piston pin. The spinning end of this tool is recessed so that its annular edge forms a 60 degree angle with the side of the tool. The corner between the bottom of the tool and the cylindrical edge is rounded off with a small radius. This spinning tool is formed of steel and is hardened in the conventional manner. The tool is rotatably mounted in a spinning machine or large drill press and is rotated between one and two hundred R. P. M. The axis of the piston pin is aligned with the tool axis and the latter is fed down against the piston. A pair of retaining ears 18 are thus formed at each side of the piston. It will be noted that the periphery of the piston is arcuate and consequently, the spinning tool initially coacts only with the piston at two points, one above and the other below the pin. However, as the spinning tool is fed into the work these points increase in area and form the two arcuate shaped retaining ears 18, each of which has a cross section at its largest point, as shown in Figure 3.

The preferred procedure in spinning the piston is to place the piston in a die having a cylindrical piston receiving opening. The piston is then held so that a tool receiving axial opening in the die is aligned with the piston pin. A spacing block is inserted between the inner ends of the bosses 13, which block prevents the piston from collapsing due to the pressure of the spinning tool. The tool is now rotated in the die and same is fed downwardly until the ears 18 are formed. This occurs when the tool almost touches the metal of the piston around the full diameter of the tool. The piston is then removed from the die and the piston pin 15 and connecting rod 16 are assembled into their positions. The piston is then reinserted into the die and a second pair of ears are spun over the free end of the piston pin.

It will be noted that a clearance is maintained between the ends of the piston pin and the ears 18, this clearance being about thirty thousandths of an inch for a piston three inches in diameter. It will also be noted that the ends of the piston pin are rounded somewhat to correspond to the shape of the ears 18.

Referring to Figure 3, I have shown by dotted lines 20 a burr which is pushed outwardly from the piston when the tool is spun into place. This burr must be removed in order to keep the piston cylindrical. To remove this burr I prefer to use a form grinding wheel having an arcuate face corresponding to the periphery of the piston and to run the piston lengthwise underneath the wheel to thereby grind off the burr. It is preferable to adjust the wheel so that from one half to one thousandths of an inch is removed from the periphery of the piston at each pin boss. This removal does not affect the fit of the piston in the cylinder inasmuch as the portions of the piston skirt which receive the side thrust are truly cylindrical.

Figures 5 and 6 show an alternate scheme for securing the pin in place. In this device a milling tool of about two-thirds the diameter of the piston pin is used to machine a pair of diametrically opposed arcuate grooves at each end of the pin. The bottom of the tool is flat with the sides receding at a 45 degree angle, as shown by dotted lines 21 in Figure 5. The tool is fed radially into the metal at the end of each boss 13 to form an arcuate groove 22. A second diametrically placed groove 22 is similarly formed. It will be noted that the outer edge of each groove 22 extends radially beyond the diameter of the piston pin a distance shown by $x$ in Figure 5. Consequently, the greatest distance between the two opposed edges is materially greater than the piston pin diameter.

In order to secure the pin in place a strip of steel 23 having arcuate ends is formed with a bend at its center, as shown by dotted lines 24. The distance between the ends of this strip is greater than the pin diameter but less than the distance between the two opposed outer edges of the grooves 22 so that the strip may be placed against the inner walls of the grooves and then flattened, as shown by solid lines in Figure 5. The flattening operation forces the ends of the strip into contact with the bottom of the grooves to thereby fixedly secure the strip in its position. The strip is pressed so that it lies entirely within the periphery of the piston. This construction is equally as good as the device shown in Figure 3, each of the structures requiring a minimum of bearing length for their installation.

Among the many advantages arising from the use of my improved construction, it may be well to mention that no extra parts or difficult machine operations are required to form a satisfactory pin retaining means. Although the piston and connecting rod and piston pin must be serviced as a unit when this construction is used, this is not a material objection in the modern automobile inasmuch as the design of such parts has been perfected so that the individual units wear out at practically the same time. Of course, new piston rings may be installed without the removal of the wrist pin.

Referring to Figure 7, I have provided an annular groove 25 at the outer end of each boss 13 into which a welch plug 26 is expanded in the conventional manner. This device prevents the pin from contacting the cylinder walls.

It will be noted that an opening 27 of about three-sixteenths of an inch diameter extends through the center of the plug 26. This opening is punched in the plug prior to its assembly in the piston. It is important that this opening be provided as it allows a punch to be inserted through the plug so that the plug may be removed when it is desired to remove the pin from the piston. A further advantage of this opening is that it lessens the pressure on the piston when the plug is flattened, a portion of the metal flowing inwardly into this opening. Still a further advantage is that oil collects around the plug, a portion of which works its way through this opening and lubricates the pin bearings in the piston, Some changes may be made in the arrangement, construction and combination of the various parts of my improved construction without departing from the spirit of my invention, and it is my intention to cover by my claims such changes as may reasonably be included within the scope thereof.

I claim as my invention:

1. In combination, a piston, a piston pin, and a connecting rod, the intermediate portion of said piston pin being rotatably mounted in said connecting rod while the end portions of said pin are rotatably mounted in suitable bearing bosses in said piston, and said combination being characterized by having two pairs of ears formed from the material of said piston, each pair of said ears extending inwardly toward the axis of said pin from diametrically opposite points therearound over the respective ends of said piston pin, for the purpose described.

2. A combination, as claimed in claim 1, wherein a substantial axial clearance is provided between the ends of said piston pin and said ears.

3. Means for rotatably securing a piston pin in a pair of piston pin bosses formed in a piston comprising, a pair of ears formed from the material of said piston, said ears extending inwardly toward the axis and over the ends of said pin from diametrically opposite points therearound, said ears being disposed at the outer ends of said piston pin bosses, and said ears being of crescent shape and having an arcuate cross section, for the purpose described.

4. In combination, a piston having a pair of axially aligned piston pin bosses projecting inwardly from the respective sides of said piston, the outer ends of said bosses intersecting the cylindrical sides of the piston, a piston pin rotatably mounted in said bosses, said pin being materially shorter than the diameter of said piston, and a pair of ears formed from the material of said bosses extending over each end of the piston pin but spaced therefrom sufficiently to permit a limited axial reciprocation of said pin.

CHAS. E. SORENSEN.